United States Patent
Hwang et al.

(10) Patent No.: US 10,852,571 B2
(45) Date of Patent: Dec. 1, 2020

(54) DISPLAY MODULE AND METHOD OF TESTING THE SAME

(71) Applicant: Samsung Display Co., Ltd., Yongin-Si (KR)

(72) Inventors: Hyun-been Hwang, Suwon-si (KR); Kinyeng Kang, Sejong-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 253 days.

(21) Appl. No.: 15/951,543

(22) Filed: Apr. 12, 2018

(65) Prior Publication Data
US 2018/0307067 A1     Oct. 25, 2018

(30) Foreign Application Priority Data

Apr. 21, 2017  (KR) .......................... 10-2017-0051845

(51) Int. Cl.
*G02F 1/13*     (2006.01)
*G02F 1/1333*   (2006.01)
*G02F 1/1345*   (2006.01)

(52) U.S. Cl.
CPC ........ *G02F 1/1309* (2013.01); *G02F 1/13458* (2013.01); *G02F 1/133345* (2013.01)

(58) Field of Classification Search
CPC ..................................................... G02F 1/1309
See application file for complete search history.

(56) References Cited

U.S. PATENT DOCUMENTS

| | | | |
|---|---|---|---|
| 7,102,726 B2 | 9/2006 | Byun et al. | |
| 7,714,815 B2 * | 5/2010 | Kim | ..................... G09G 3/3233 |
| 8,749,262 B2 * | 6/2014 | Jung | ..................... G09G 3/006 |
| | | | 324/760.01 |
| 8,780,309 B2 | 7/2014 | Kim et al. | |
| 9,494,818 B2 | 11/2016 | Park et al. | |
| 2018/0233436 A1 * | 8/2018 | Lee | ..................... H01L 23/4824 |

FOREIGN PATENT DOCUMENTS

KR       100635944 B1     10/2006
KR     1020110060249 A     6/2011

* cited by examiner

*Primary Examiner* — Walter L Lindsay, Jr.
*Assistant Examiner* — Milton Gonzalez
(74) *Attorney, Agent, or Firm* — Cantor Colburn LLP

(57) ABSTRACT

A display module includes a plurality of pixels, a plurality of data lines connected to the pixels, a demultiplexer connected to the data lines, a plurality of first pads connected to the demultiplexer, and a plurality of second pads. The second pads include a plurality of first test pads connected to corresponding data lines of the data lines and a first dummy pad connected to one first test pad of the first test pads.

18 Claims, 12 Drawing Sheets

DISPLAY MODULE AND METHOD OF TESTING THE SAME

This application claims priority to Korean Patent Application No. 10-2017-0051845, filed on Apr. 21, 2017, and all the benefits accruing therefrom under 35 U.S.C. § 119, the content of which in its entirety is herein incorporated by reference.

BACKGROUND

1. Field

Exemplary embodiments of the invention relate to a display module and a method of testing the same. More particularly, exemplary embodiments of the invention relate to a display module including visual inspection ("VI") pads and a method of testing the display module using the VI pads.

2. Description of the Related Art

In recent years, various electronic devices, such as a smartphone, a digital camera, a notebook computer, a navigation unit, a smart television, etc., have been developed. Each electronic device generally includes a display device to provide information.

The display device includes a display module including a display panel, and the display module is tested using a visual inspection ("VI") method when the display device is manufactured. The VI method is one of non-destructive tests and has various advantages, e.g., simple and convenient usage, and does not desire special equipment.

SUMMARY

Exemplary embodiments of the invention provide a display module including visual inspection pads.

Exemplary embodiments of the invention provide a method of testing the display module, which is capable of preventing a pixel from being damaged during a testing process of a display panel or a display module.

Exemplary embodiments of the invention provide a display module including a plurality of pixels, a plurality of data lines connected to the pixels, a demultiplexer connected to the data lines, a plurality of first pads connected to the demultiplexer, and a plurality of second pads. The second pads include a plurality of first test pads connected to corresponding data lines of the data lines and a first dummy pad connected to one first test pad of the first test pads.

In an exemplary embodiment, at least one of the first test pads may be connected to corresponding data lines of the data lines.

In an exemplary embodiment, the display module may further include a printed circuit board connected to the first pads.

In an exemplary embodiment, the display module may further include a plurality of third pads including a plurality of second test pads connected to corresponding data lines of the data lines and a second dummy pad connected to one second test pad of the second test pads.

In an exemplary embodiment, the first pads may be disposed between the second pads and the third pads.

In an exemplary embodiment, the one first test pad among the first test pads may be disposed at an outermost position among the first test pads, and the one second test pad among the second test pads may be disposed at an outermost position among the second test pads.

In an exemplary embodiment, the second pads may further include a sub-pad insulated from the first test pads and the first dummy pad. The sub-pad may be disposed between the one first test pad among the first test pads and the first dummy pad.

In an exemplary embodiment, the display module may further include a driving circuit disposed on the printed circuit board.

In an exemplary embodiment, the demultiplexer may receive a data signal from the driving circuit and apply the data signal to at least one of the data lines.

In an exemplary embodiment, the display module may further include a switching device including an input electrode connected to the first dummy pad, an output electrode connected to one of the first test pads, and a control electrode.

In an exemplary embodiment, the second pads may further include a control pad connected to the control electrode of the switching device.

In an exemplary embodiment, the second pads may further include a second dummy pad connected to one of the first test pads.

In an exemplary embodiment, the first test pads may be spaced apart from each other at a first distance, and the one first test pad of the first test pads and the first dummy pad may be spaced apart from each other at a second distance different from the first distance. The second distance may be greater than the first distance.

Exemplary embodiments of the invention provide a method of testing a display module including aligning a display module that includes a plurality of test pads and a dummy pad connected to one test pad among the test pads with a test equipment that includes a plurality of probe pins corresponding to the test pads and the dummy pad, performing a first testing operation that applies a first electrical signal to the one test pad among the test pads to measure the applied first electrical signal through the dummy pad, and performing a second testing operation that applies a second electrical signal to each of the test pads.

In an exemplary embodiment, the method may further include determining whether to proceed the second testing operation depending on a result of the first testing operation.

In an exemplary embodiment, the display module may further include a plurality of pixels and a plurality of data lines connected to the plurality of pixels, and the test pads may be connected to the data lines.

In an exemplary embodiment, the display module may further include a sub-pad insulated from the test pads and the dummy pad, and the test pads, the dummy pad, and the sub-pad may be aligned in a line.

In an exemplary embodiment, the display module may further include a switching device that includes an input electrode connected to the dummy pad, an output electrode connected to one of the test pads, and a control electrode to which a turn-on voltage is applied in the first testing operation.

According to the above, the pixel may be prevented from being damaged while the display panel or the display module is tested.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1:
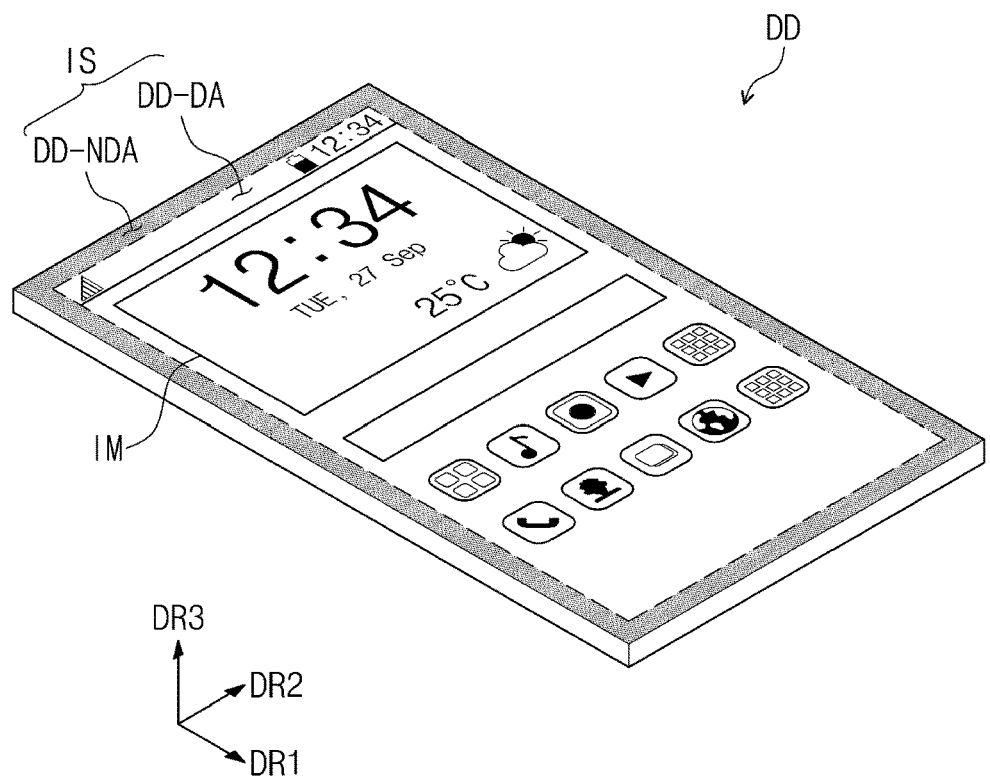
FIG. 1 is a perspective view showing an exemplary embodiment of a display device according to the invention.

Hereinafter, the invention will be explained in detail with reference to the accompanying drawings.

In the drawings, the thickness of layers, films, and regions are exaggerated for clarity. As used herein, the term "and/or" includes any and all combinations of one or more of the associated listed items.

It will be further understood that the terms "comprises" and/or "comprising," or "includes" and/or "including", when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). In an exemplary embodiment, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims. FIG. 1 is a perspective view showing a display device DD according to an exemplary embodiment of the invention.

A display surface IS in which an image IM is displayed is substantially parallel to a surface defined by a first directional axis DR1 and a second directional axis DR2. A normal line direction of the display surface IS, i.e., a thickness direction of the display device DD, indicates a third directional axis DR3. In each member, a front surface (or an upper surface) is distinguished from a rear surface (or a lower surface) by the third directional axis DR3. However, the first to third directional axes DR1 to DR3 are relative to each other, and thus the first to third directional axes DR1 to DR3 may be changed to any other directions. Hereinafter, first to third directions correspond to directions respectively indicated by the first to third directional axes DR1 to DR3, and thus the first to third directions are assigned with the same reference numerals as the first to third directional axes DR1 to DR3.

The display device DD according to the illustrated exemplary embodiment may be applied to a large-sized electronic item, such as a television set, a monitor, etc., and a small and medium-sized electronic item, such as a mobile phone, a tablet, a car navigation unit, a game unit, a smart watch, etc., but it should not be limited thereto or thereby.

Referring to FIG. 1, the display surface IS of the display device DD may include a plurality of areas. The display surface IS of the display device DD includes a display area DD-DA in which the image IM is displayed and a non-display area DD-NDA disposed adjacent to the display area DD-DA. The non-display area DD-NDA does not display the image IM. FIG. 1 shows application icons as the image IM. The display area DD-DA has a substantially quadrangular shape, and the non-display area DD-NDA surrounds the display area DD-DA, for example, but they should not be limited thereto or thereby. That is, the shape of the display area DD-DA and the shape of the non-display area DD-NDA may be designed relative to each other.

Figure 2:
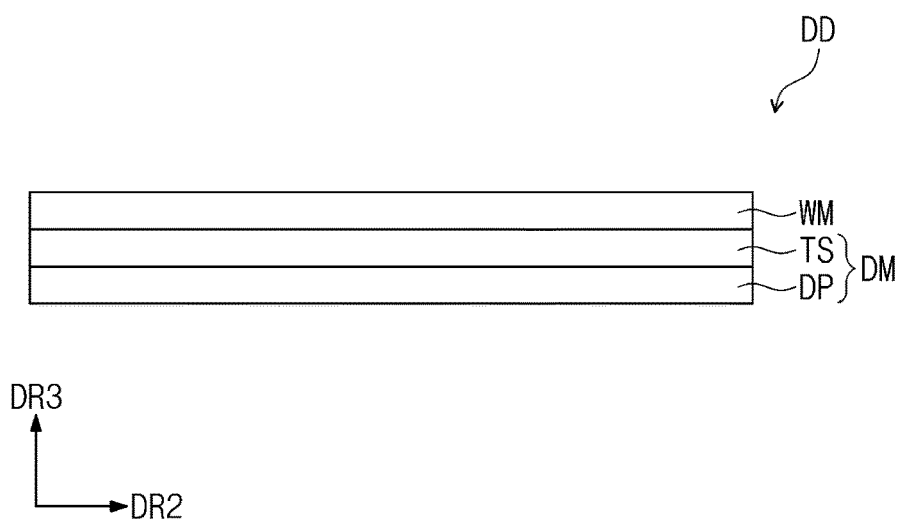
FIG. 2 is a cross-sectional view showing a portion of the display device shown in FIG. 1.

FIG. 2 is a cross-sectional view showing a portion of the display device DD shown in FIG. 1. The display device DD includes a window member WM and a display module DM. The display module DM includes an input sensing unit TS and a display panel DP, but it should not be limited thereto or thereby. The display module DM may be understood to include the display panel DP and electronic components used to drive the display panel DP.

The window member WM protects the display module DM from external impacts and provides an input surface to a user. In an exemplary embodiment, the window member WM includes a glass or plastic material, for example. The window member WM is transparent to transmit a light generated by the display panel DP.

Although not shown separately, an adhesive member may be disposed between the window member WM and the display module DM.

Although not shown separately, the display device DD may include a protective film disposed under the display module DM. In an exemplary embodiment, the protective film may include a plastic film as a base layer, for example. However, a material for the protective film should not be limited to plastic resins and may include a composite of organic and inorganic materials.

Figure 3:
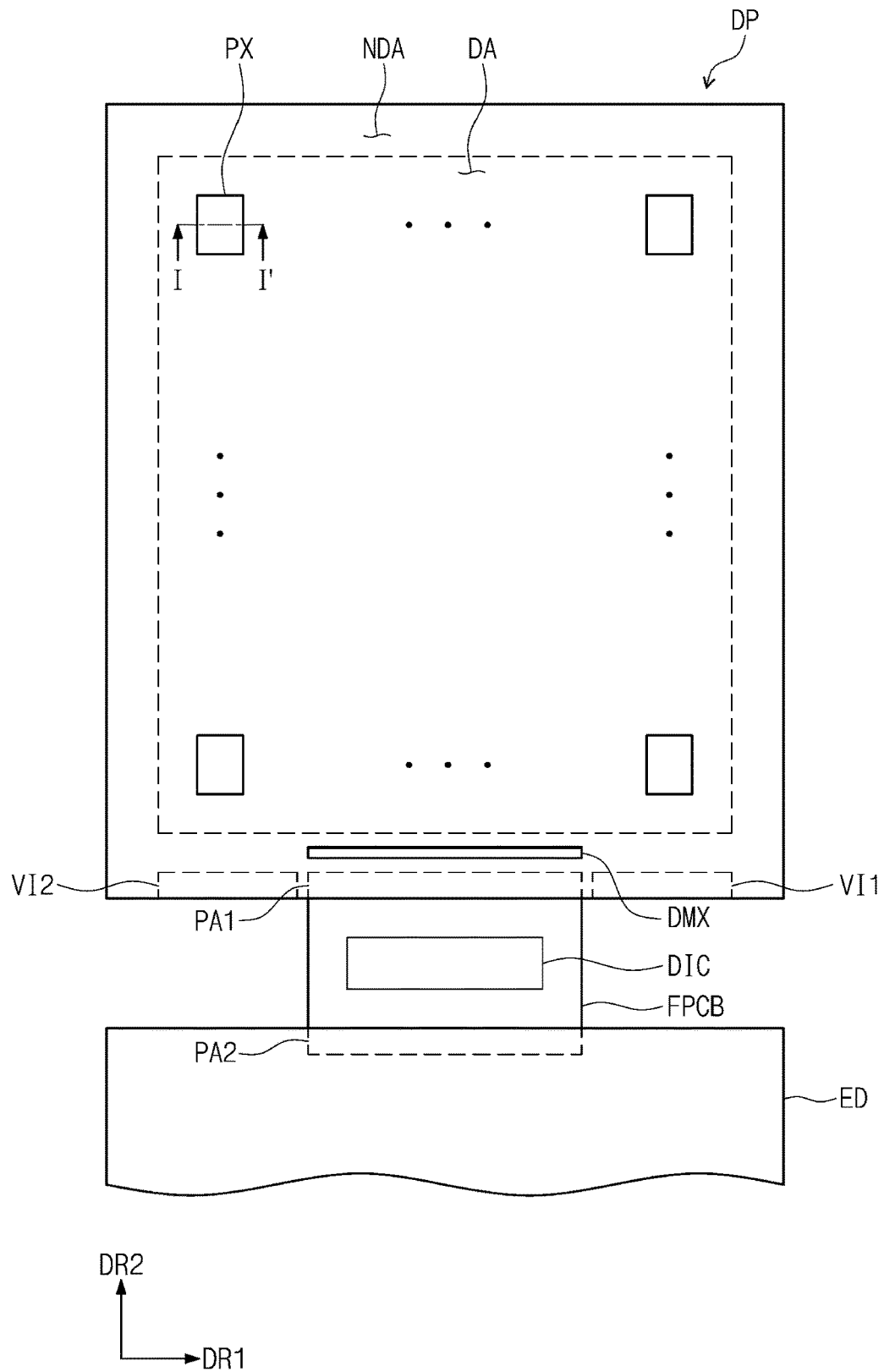
FIG. 3 is a plan view showing a display panel shown in FIG. 2.

FIG. 3 is a plan view showing the display panel DP shown in FIG. 2.

The display panel DP includes a display area DA and a non-display area NDA. The display area DA includes pixels PX arranged therein to provide image information to the user. The non-display area NDA corresponds to a peripheral area of the display area DA, and lines and electronic components, which are used to drive the pixels PX, are arranged in the non-display area NDA.

The non-display area NDA includes a first pad area PA1, a first test pad area VI1, and a second test pad area VI2.

Data signals SG (refer to FIG. 6) are applied to the display area DA through the first pad area PA1. The image IM may be displayed in the display area DD-DA (refer to FIG. 1) by the data signals SG (refer to FIG. 6). A printed circuit board FPCB may be connected to the first pad area PA1.

Test signals SGT (refer to FIG. 6) are applied to the display area DA through the first test pad area VI1 and the second test pad area VI2. The pixels PX emit the light in response to the test signals SGT. It may be checked whether the display panel DP is normally operated by testing whether the pixels PX emit the light.

A demultiplexer DMX may be disposed in the non-display area NDA, but it should not be limited thereto or thereby. According to another exemplary embodiment, the demultiplexer DMX may be disposed (e.g., mounted) on the printed circuit board FPCB.

The demultiplexer DMX receives the data signals SG (refer to FIG. 6) in the first pad area PA1 and outputs the data signals SG (refer to FIG. 6) to the display area DA. In the exemplary embodiment of the invention, the display panel DP may include a plurality of demultiplexers DMX.

An electronic device ED may be connected to one end of the printed circuit board FPCB. The electronic device ED includes a second pad area PA2, and the printed circuit board FPCB is connected to the electronic device ED through the second pad area PA2.

A driving circuit DIC may be disposed (e.g., mounted) on the printed circuit board FPCB. In an exemplary embodiment, the driving circuit DIC may be disposed (e.g., mounted) on the printed circuit board FPCB by a chip-on-glass ("COG") method or a chip-on-plastic ("COP") method, for example.

The driving circuit DIC may be, but not limited to, a source driver integrated circuit ("IC") that applies a data voltage to the display area DA of the display panel DP, a scan driver IC that applies a gate voltage to the display area DA of the display panel DP, or an integrated-driver IC in which the source driver and the scan driver are integrated. FIG. 3 shows the display panel DP on which one driving circuit DIC is disposed (e.g., mounted), but a plurality of ICs may be disposed (e.g., mounted) on the display panel DP according to embodiments.

The pixels PX are arranged along the first direction DR1 and the second direction DR2 substantially perpendicular to the first direction DR1 in a matrix form. In the exemplary embodiment of the invention, each of the pixels PX displays at least one of a red color, a green color, and a blue color, for example. In an exemplary embodiment of the invention, each of the pixels PX displays at least one of a white color, a cyan color, and a magenta color, for example. The pixels PX may be defined as a display part of the display panel DP. Each of the pixels PX may include a light emitting element, and one of the above-mentioned colors may be displayed by the light emitting element.

In an exemplary embodiment, the display panel DP may be a liquid crystal display panel, an organic light emitting display panel, or an electrowetting display panel, for example, depending on the type of the pixels PX. Hereinafter, the organic light emitting display panel will be described as the display panel DP, but the display panel DP should not be limited to the organic light emitting display panel.

Figure 4:
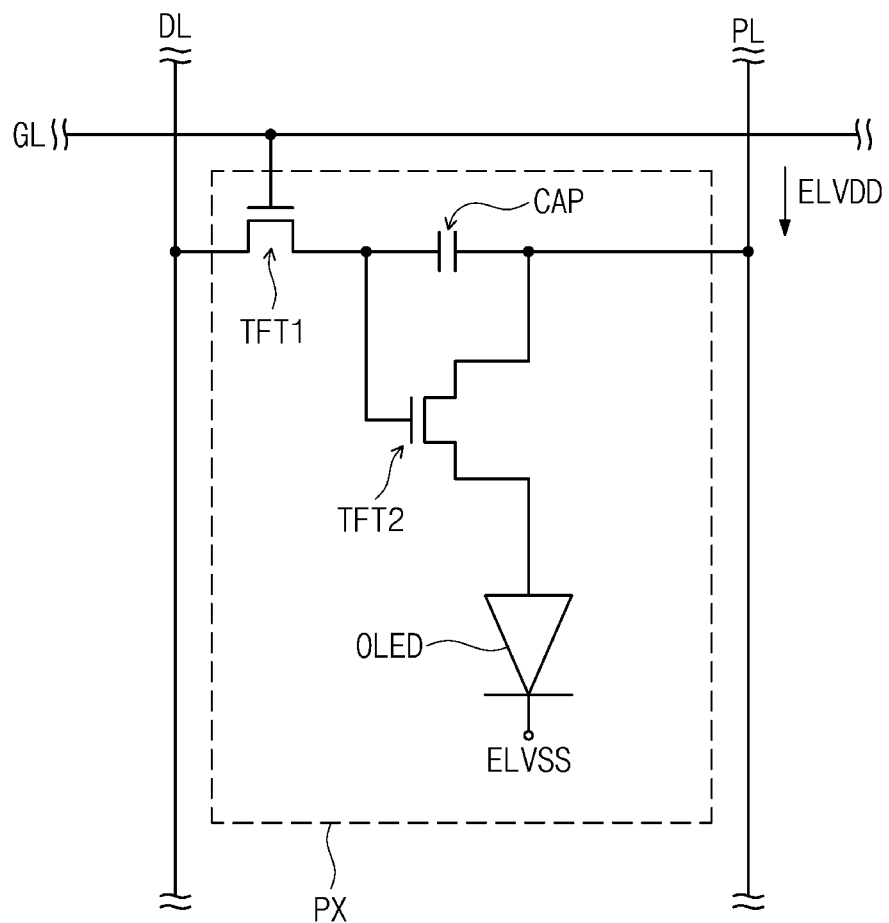
FIG. 4 is an equivalent circuit diagram showing a pixel shown in FIG. 3.

FIG. 4 is an equivalent circuit diagram showing the pixel PX shown in FIG. 3. FIG. 4 shows the pixel connected to one gate line GL, one data line DL, and a power line PL as a representative example. Configurations of the pixel PX should not be limited to thereto or thereby.

The pixel PX includes a light emitting element OLED. The light emitting element OLED may be a front surface light emitting type diode, a rear surface light emitting type diode, or a both surface light emitting type diode. The pixel PX includes a first transistor TFT1 (or a switching transistor), a second transistor TFT2 (or a driving transistor), and a capacitor CAP as a circuit part to drive the light emitting element OLED. The light emitting element OLED generates a light in response to an electrical signal provided from the first and second transistors TFT1 and TFT2.

The first transistor TFT1 outputs a data signal provided through the data line DL in response to a scan signal provided through the gate line GL. The capacitor CAP is charged with a voltage corresponding to the data signal provided from the first transistor TFT1 and a power voltage ELVDD transmitted though the power line PL.

The second transistor TFT2 is connected to the light emitting element OLED. The second transistor TFT2 controls a driving current flowing through the light emitting element OLED in response to an amount of electric charge held in the capacitor CAP. The light emitting element OLED emits the light during a turn-on period of the second transistor TFT2.

Figure 5:
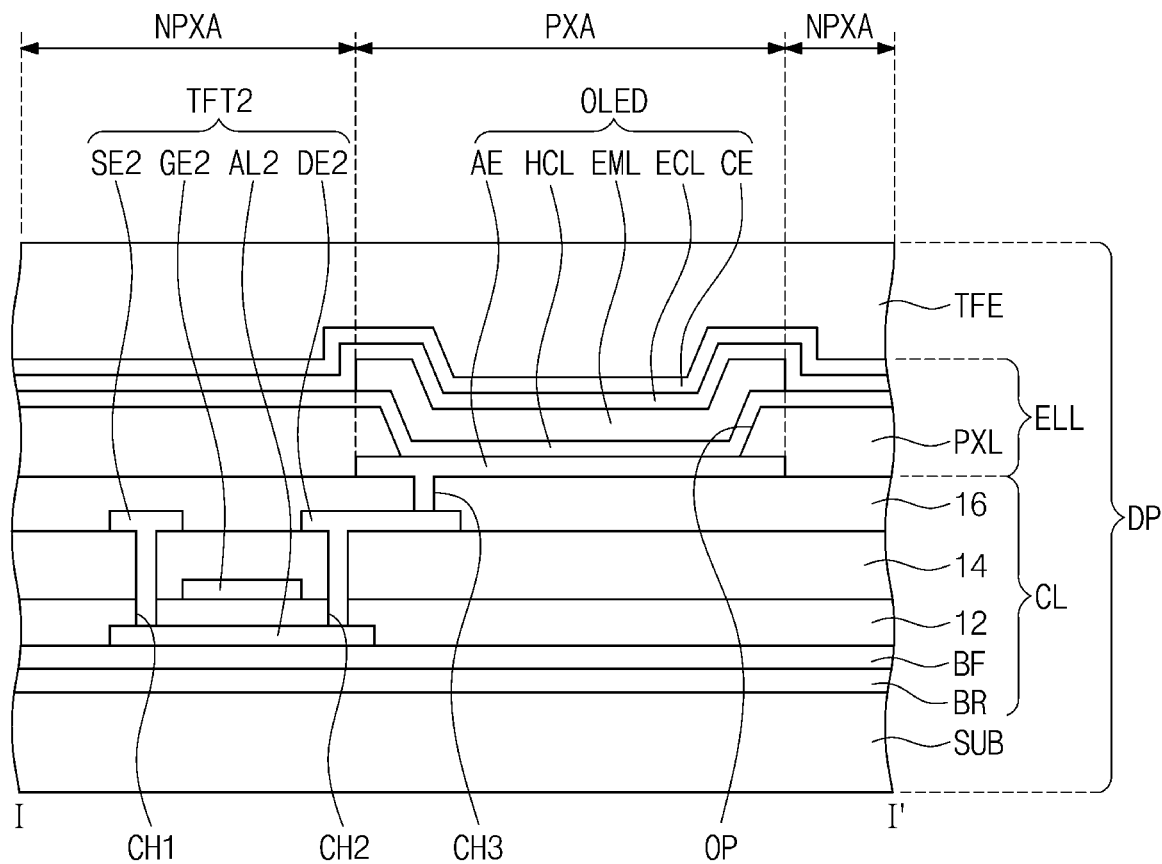
FIG. 5 is a cross-sectional view taken along line I-I' of FIG. 3.

FIG. 5 is a cross-sectional view taken along line I-I' of FIG. 3. FIG. 5 shows a cross-section corresponding to portions of the second transistor TFT2 and the light emitting element OLED of the equivalent circuit diagram shown in FIG. 4.

Referring to FIG. 5, a circuit layer CL is disposed on a base layer SUB. A semiconductor pattern AL2 of the second transistor TFT2 is disposed on the base layer SUB.

In an exemplary embodiment, the semiconductor pattern AL2 may include amorphous silicon, polysilicon, or a metal oxide semiconductor.

The circuit layer CL may include organic/inorganic layers BR, BF, 12, 14, and 16, the first transistor TFT1 (refer to FIG. 4), and the second transistor TFT2. The organic/inorganic layers BR, BF, 12, 14, and 16 may include functional layers BR and BF, a first insulating layer 12, a second insulating layer 14, and a third insulating layer 16.

The functional layers BR and BF may be disposed on a surface of the base layer SUB. The functional layers BR and BF may include at least one of a barrier layer BR and a buffer layer BF. The semiconductor pattern AL2 may be disposed on the barrier layer BR or the buffer layer BF.

The first insulating layer 12 may be disposed on the base layer SUB to cover the semiconductor pattern AL2. The first insulating layer 12 includes an organic layer and/or an inorganic layer. In an exemplary embodiment, the first insulating layer 12 may include a plurality of inorganic thin layers. In an exemplary embodiment, the inorganic thin layers may include a silicon nitride layer and a silicon oxide layer, for example.

A control electrode GE2 of the second transistor TFT2 is disposed on the first insulating layer 12. Although not shown in drawing figures, a control electrode of the first transistor TFT1 (refer to FIG. 4) may be disposed on the first insulating layer 12. The control electrode GE2 may be provided through the same photolithography process as the gate line GL (refer to FIG. 4). In other words, the control electrode GE2 may include the same material and stacking structure as those of the gate line GL, and the control electrode GE2 may be disposed in the same layer as the gate line GL.

The second insulating layer 14 is disposed on the first insulating layer 12 to cover the control electrode GE2. The second insulating layer 14 includes an organic layer and/or an inorganic layer. In an exemplary embodiment, the second insulating layer 14 may include a plurality of inorganic thin layers. In an exemplary embodiment, the inorganic thin layers may include a silicon nitride layer and a silicon oxide layer, for example.

The data line DL (refer to FIG. 4) is disposed on the second insulating layer 14. An input electrode SE2 and an output electrode DE2 of the second transistor TFT2 are disposed on the second insulating layer 14. Although not shown in drawing figures, an input electrode and an output electrode of the first transistor TFT1 (refer to FIG. 4) are disposed on the second insulating layer 14. The input electrode SE2 is branched from a corresponding data line among the data lines DL. The power line PL (refer to FIG. 4) may be disposed in the same layer as the data lines DL. The input electrode SE2 may be branched from the power line PL.

A portion of an electrode of the capacitor CAP is disposed on the second insulating layer 14. The portion of the electrode of the capacitor CAP may be manufactured through the same photolithography process as those of the data lines DL and the power line PL. The portion of the electrode of the capacitor CAP may include the same material and stacking structure as those of the data line DL and the power line PL, and the portion of the electrode of the capacitor CAP may be disposed in the same layer as the data line DL and the power line PL.

The input electrode SE2 and the output electrode DE2 are connected to the semiconductor pattern AL2 respectively through a first contact hole CH1 and a second contact hole CH2, which are defined through the first insulating layer 12 and the second insulating layer 14. According to another exemplary embodiment of the invention, each of the first transistor TFT1 and the second transistor TFT2 may have a bottom gate structure, for example.

The third insulating layer 16 is disposed on the second insulating layer 14 to cover the input electrode SE2 and the output electrode DE2. The third insulating layer 16 includes an organic layer and/or an inorganic layer. In an exemplary embodiment, the third insulating layer 16 may include an organic material to provide a flat surface.

One of the first insulating layer 12, the second insulating layer 14, and the third insulating layer 16 may be omitted depending on a circuit configuration of the pixel. Each of the second insulating layer 14 and the third insulating layer 16 may be defined as an interlayer insulating layer. The interlayer insulating layer is disposed between a conductive pattern disposed above the interlayer insulating layer and a conductive pattern disposed under the interlayer insulating layer to insulate the conductive patterns from each other.

A light emitting element layer ELL is disposed on the third insulating layer 16. The light emitting element layer ELL includes a pixel definition layer PXL and the light emitting element OLED. An anode AE is disposed on the third insulating layer 16. The anode AE is connected to the output electrode DE2 of the second transistor TFT2 through a third contact hole CH3 defined through the third insulating layer 16. The pixel definition layer PXL is provided with an opening OP defined therethrough. A portion of the anode AE is exposed through the opening OP of the pixel definition layer PXL.

The light emitting element layer ELL includes a light emitting area PXA and a non-light emitting area NPXA disposed adjacent to the light emitting area PXA. The non-light emitting area NPXA surrounds the light emitting area PXA. In the illustrated exemplary embodiment, the light emitting area PXA is defined to correspond to the anode AE. However, the light emitting area PXA should not be limited thereto or thereby as long as the light emitting area PXA emits the light. The light emitting area PXA may be defined to correspond to a portion of the anode AE exposed through the opening OP.

A hole control layer HCL may be commonly disposed in the light emitting area PXA and the non-light emitting area NPXA. Although not shown separately, a layer like the hole control layer HCL may be commonly provided in the pixels PX (refer to FIG. 4).

A light emitting layer EML is disposed on the hole control layer HCL. The light emitting layer EML may be disposed only in an area corresponding to the opening OP. That is, the light emitting layer EML may be provided to each of the pixels PX.

The light emitting layer EML may include an organic material or an inorganic material.

An electron control layer ECL is disposed on the light emitting layer EML. A cathode CE is disposed on the electron control layer ECL. The cathode CE may be commonly disposed on the pixels PX.

In the illustrated exemplary embodiment, the light emitting layer EML is patterned, but the light emitting layer EML may be commonly disposed on the pixels PX without being patterned. In this case, the light emitting layer EML may generate a white light, for example. In addition, the light emitting layer EML may have a multi-layer structure.

In the exemplary embodiment of the invention, a thin film encapsulation layer TFE may directly cover the cathode CE. In the exemplary embodiment of the invention, a capping layer may further be provided to cover the cathode CE. In this case, the thin film encapsulation layer TFE may directly cover the capping layer. The thin film encapsulation layer TFE may include an organic layer including an organic material and an inorganic layer including an inorganic material.

Referring to FIGS. 2 and 4, the input sensing unit TS may be directly disposed on the thin film encapsulation layer TFE.

Figure 6:
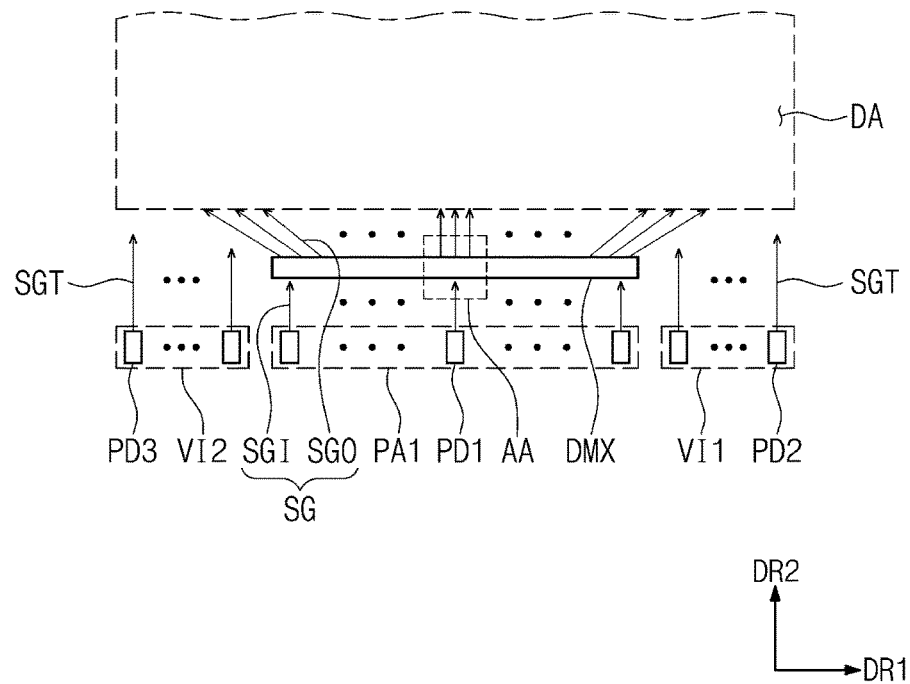
FIG. 6 is a view showing a portion of a first pad area, a first test pad area, a second test pad area, and a display area shown in FIG. 3.
Figure 7:
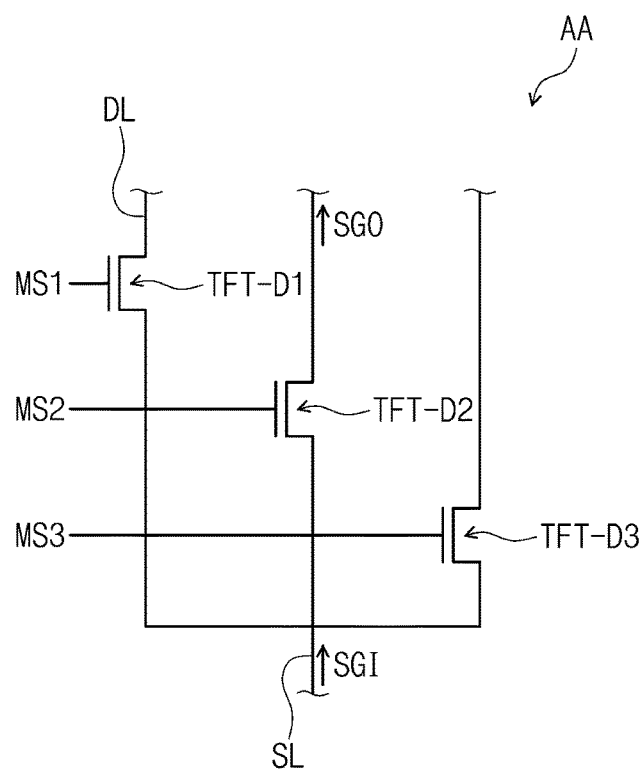
FIG. 7 is an equivalent circuit diagram showing an area AA of FIG. 6.

FIG. 6 is a view showing a portion of the first pad area PA1, the first test pad area VI1, the second test pad area VI2, and the display area DA shown in FIG. 3. FIG. 7 is an equivalent circuit diagram showing an area AA of FIG. 6.

The first pad area PA1 includes a plurality of first pads PD1. The first test pad area VI1 includes a plurality of second pads PD2. The second test pad area VI2 includes a plurality of third pads PD3.

The demultiplexer DMX receives an input data signal SGI from the first pad area PA1 through signal lines SL.

The demultiplexer DMX may include transistors TFT-D1, TFT-D2, and TFT-D3. The demultiplexer DMX turns on or off the transistors TFT-D1, TFT-D2, and TFT-D3 using control signals MS1, MS2, and MS3 respectively applied to control electrodes of the transistors TFT-D1, TFT-D2, and TFT-D3 to apply an output data signal SG0 to at least one of the data lines DL. The output data signal SG0 is applied to the display area DA through the data lines DL.

The first test pad area VI1 and the second test pad area VI2 provide test signals SGT to the display area DA. The test signals SGT may be directly applied to the display area DA without passing through the demultiplexer DMX. In the exemplary embodiment of the invention, one of the test signals SGT may be applied to plural data lines. That is, one signal line that transmits the test signal SGT to the display area DA may be connected to the plural data lines DL.

Figure 8A:
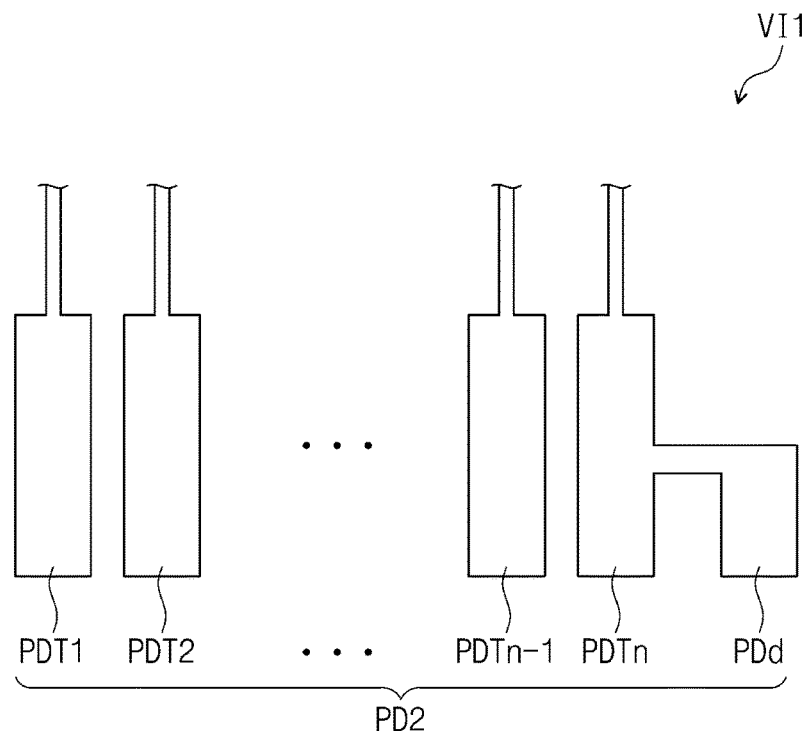
FIG. 8A is a view showing the first test pad area shown in FIG. 3.
Figure 8B:
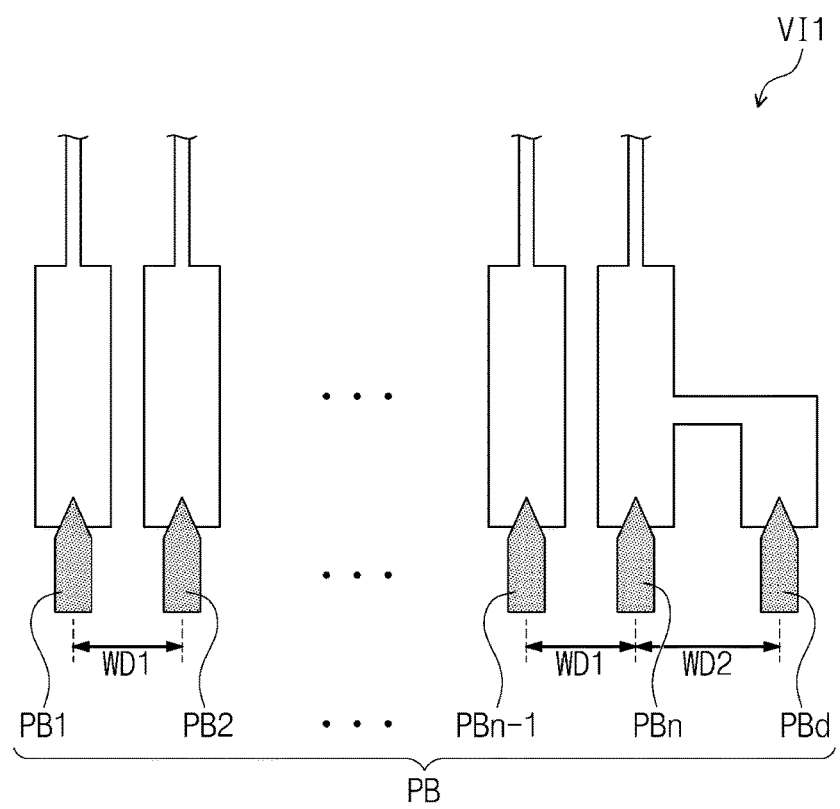
FIG. 8B is a view showing probe pins of a test equipment, which contact the first test pad area shown in FIG. 8A.
Figure 8C:
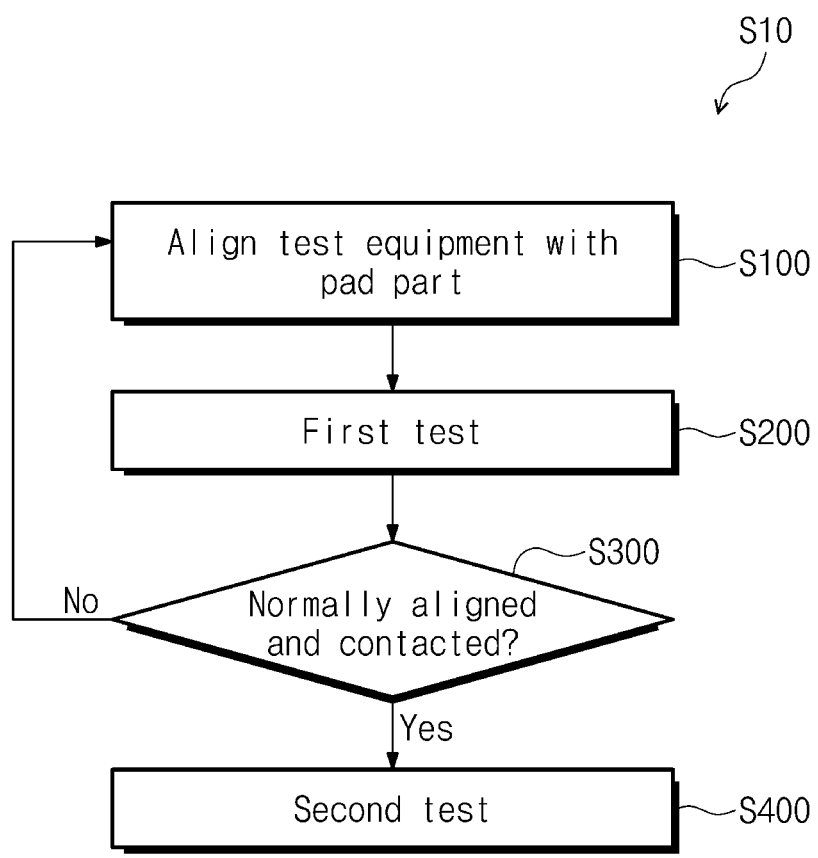
FIG. 8C is a flowchart showing an exemplary embodiment of a method of testing a display module according to the invention.

FIG. 8A is a view showing the first test pad area VI1 shown in FIG. 3. FIG. 8B is a view showing probe pins PB of a test equipment, which contact the first test pad area VI1 shown in FIG. 8A. FIG. 8C is a flowchart showing a method of testing a display module (S10) according to an exemplary embodiment of the invention.

The second pads PD2 may include a plurality of test pads PDT1 to PDTn and a dummy pad PDd. The test pads PDT1 to PDTn are connected to the data lines DL (refer to FIGS. 4 and 7). In the exemplary embodiment of the invention, the data lines DL (refer to FIGS. 4 and 7) may be connected to one of the test pads PDT1 to PDTn.

The dummy pad PDd is electrically connected to one of the test pads PDT1 to PDTn. In FIG. 8A, the dummy pad PDd is connected to an n-th test pad PDTn, but it should not be limited thereto or thereby.

The probe pins PB of the test equipment may include test pins PB1 to PBn and a dummy pin PBd. The test pins PB1 to PBn respectively correspond to the test pads PDT1 to PDTn, and the dummy pin PBd corresponds to the dummy pad PDd.

The testing method of the display module S10 includes an aligning operation S100, a first testing operation S200, a determining operation S300, and a second testing operation S400.

Referring to FIGS. 8A to 8C, in the aligning operation S100, the second pads PD2 of the display module DM are aligned with the probe pins PB of the test equipment. The second pads PD2 are aligned to respectively correspond to the probe pins PB through the aligning operation S100.

In the first testing operation S200, the test equipment applies a first electrical signal to the n-th test pad PDTn through an n-th probe pin PBn. The test equipment measures the first electrical signal applied thereto using the dummy pad PDd and the dummy pin PBd.

In the determining operation S300, it is determined whether the second pads PD2 are aligned with and contact the probe pins PB of the test equipment. When the first electrical signal applied through the dummy pad PDd and the dummy pin PBd is normally measured, it is determined that the second pads PD2 are normally aligned with and contact the probe pins PB in the aligning operation S100, and then the second testing operation S400 proceeds. However, when the first electrical signal applied through the dummy pad PDd and the dummy pin PBd is not normally measured, it is determined that the second pads PD2 are not normally aligned with and do not normally contact the probe pins PB in the aligning operation S100, and then the aligning operation S100 proceeds again.

In the second testing operation S400, the test equipment applies a second electrical signal to the test pins PB1 to PBn. The second electrical signal may be the test signal SGT (refer to FIG. 6).

In the exemplary embodiment of the invention, the test pads PDT1 to PDTn are spaced apart from each other at a first distance WD1, and the n-th test pad PDTn is spaced apart from the dummy pad PDd at a second distance WD2 different from the first distance WD1. The second distance WD2 may be greater than the first distance WD1. As described above, since the first distance WD1 and the second distance WD2 are different from each other, it may be checked whether the probe pins PB of the test equipment are accurately aligned with the second pads PD2.

Figure 9A:
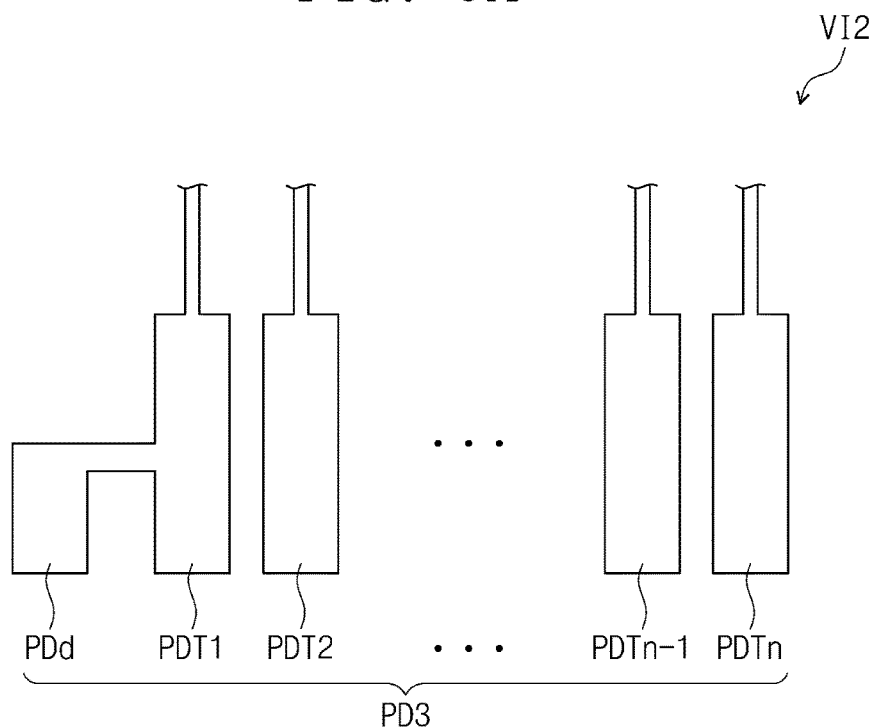
FIG. 9A is a view showing the second test pad area shown in FIG. 3.
Figure 9B:
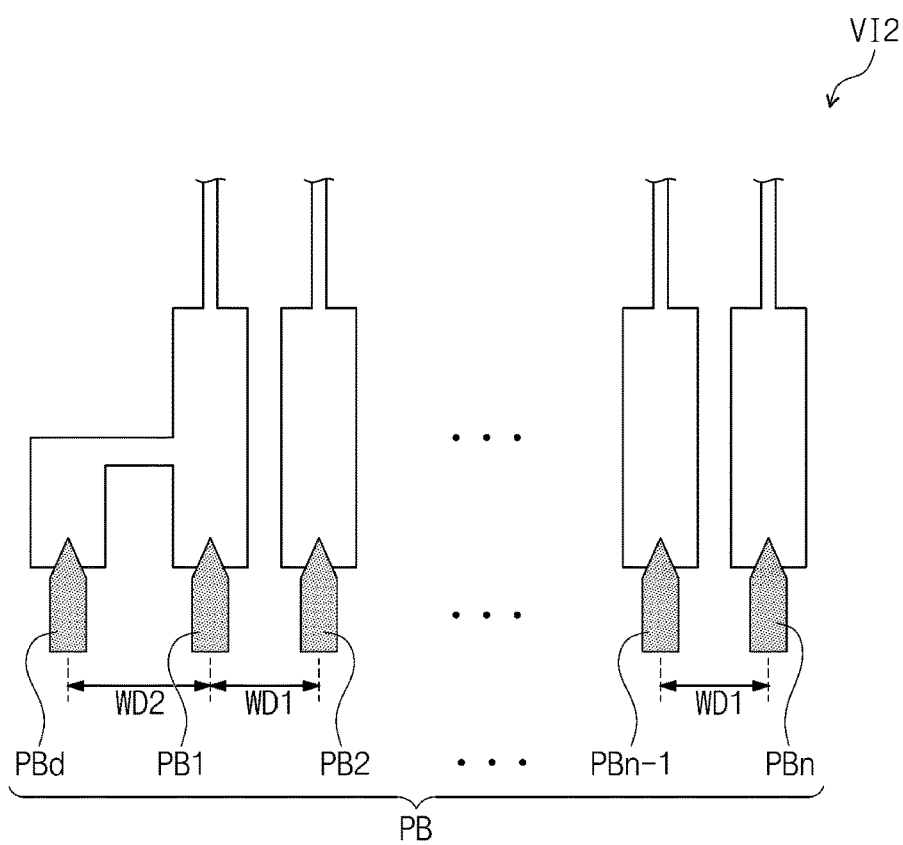
FIG. 9B is a view showing the probe pins of the test equipment, which contact the second test pad area shown in FIG. 9A.

FIG. 9A is a view showing the second test pad area VI2 shown in FIG. 3. FIG. 9B is a view showing the probe pins PB of the test equipment, which contact the second test pad area VI2 shown in FIG. 9A.

The third pads PD3 may include a plurality of test pads PDT1 to PDTn and a dummy pad PDd. The test pads PDT1 to PDTn are connected to the data lines DL (refer to FIGS. 4 and 7). In the exemplary embodiment of the invention, the data lines DL (refer to FIGS. 4 and 7) may be connected to one of the test pads PDT1 to PDTn.

The dummy pad PDd is electrically connected to one of the test pads PDT1 to PDTn. In FIG. 9A, the dummy pad PDd is connected to a first test pad PDT1, but it should not be limited thereto or thereby.

The probe pins PB of the test equipment may include test pins PB1 to PBn and a dummy pin PBd. The test pins PB1 to PBn respectively correspond to the test pads PDT1 to PDTn, and the dummy pin PBd corresponds to the dummy pad PDd.

Figure 10A:
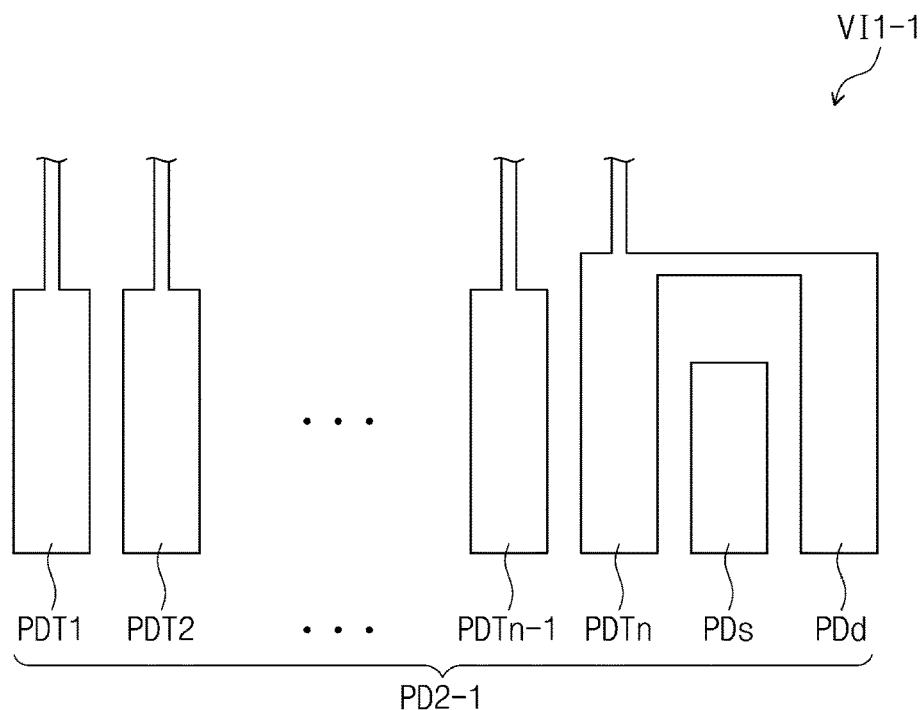
FIG. 10A is a view showing an exemplary embodiment of a first test pad area according to the invention.
Figure 10B:
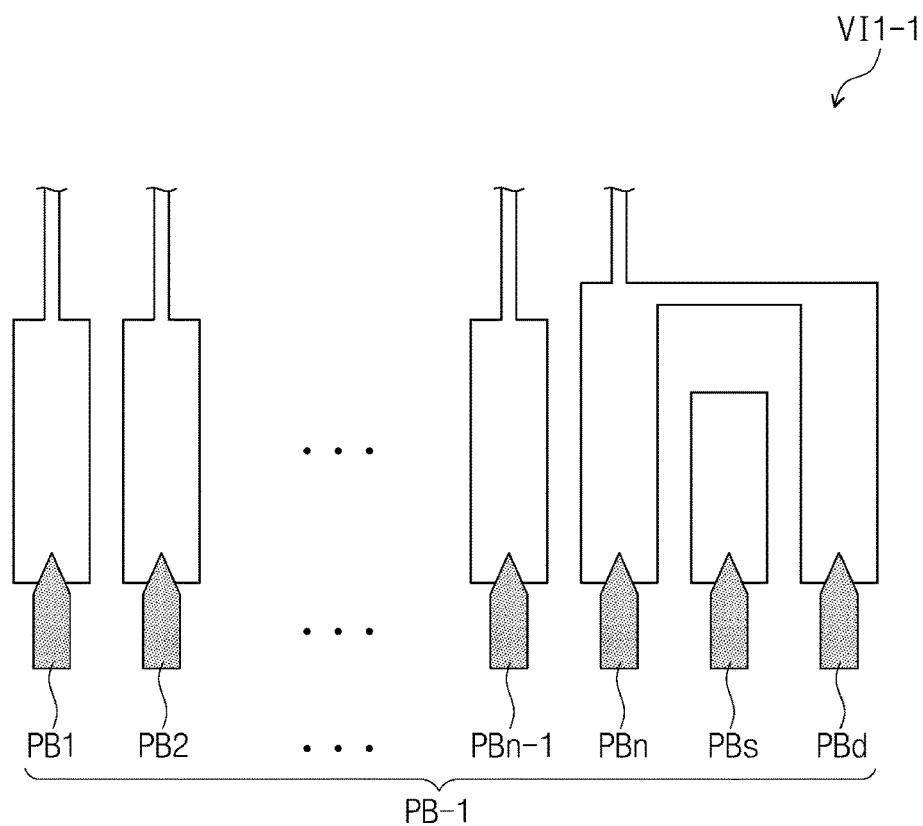
FIG. 10B is a view showing probe pins of the test equipment, which contact the first test pad area shown in FIG. 10A.

FIG. 10A is a view showing a first test pad area VI1-1 according to an exemplary embodiment of the invention. FIG. 10B is a view showing probe pins PB-1 of the test equipment, which contact the first test pad area VI1-1 shown in FIG. 10A.

The first test pad area VI1-1 may include a plurality of second pads PD2-1. The second pads PD2-1 may include a plurality of test pads PDT1 to PDTn, a dummy pad PDd, and a sub-pad PDs.

The sub-pad PDs may be disposed between an n-th test pad PDTn and the dummy pad PDd. The sub-pad PDs may be insulated from the test pads PDT1 to PDTn and the dummy pad PDd. In the exemplary embodiment of the invention, the sub-pad PDs, the n-th test pad PDTn, and the dummy pad PDd may be aligned in a line.

In the illustrated exemplary embodiment, detailed descriptions of the test pads PDT1 to PDTn and the dummy pad PDd will be omitted since the test pads PDT1 to PDTn and the dummy pad PDd have the same structure and function as those described with reference to FIG. 8A.

The probe pins PB-1 of the test equipment may include test pins PB1 to PBn, a dummy pin PBd, and a sub-pin PBs. The test pins PB1 to PBn correspond to the test pads PDT1 to PDTn, the dummy pin PBd corresponds to the dummy pad PDd, and the sub-pin PBs corresponds to the sub-pad PDs.

It may be checked whether the probe pins PB-1 of the test equipment are accurately aligned with the second pads PD2-1 using the sub-pad PDs, the n-th test pad PDTn, and the dummy pad PDd.

Figure 11A:
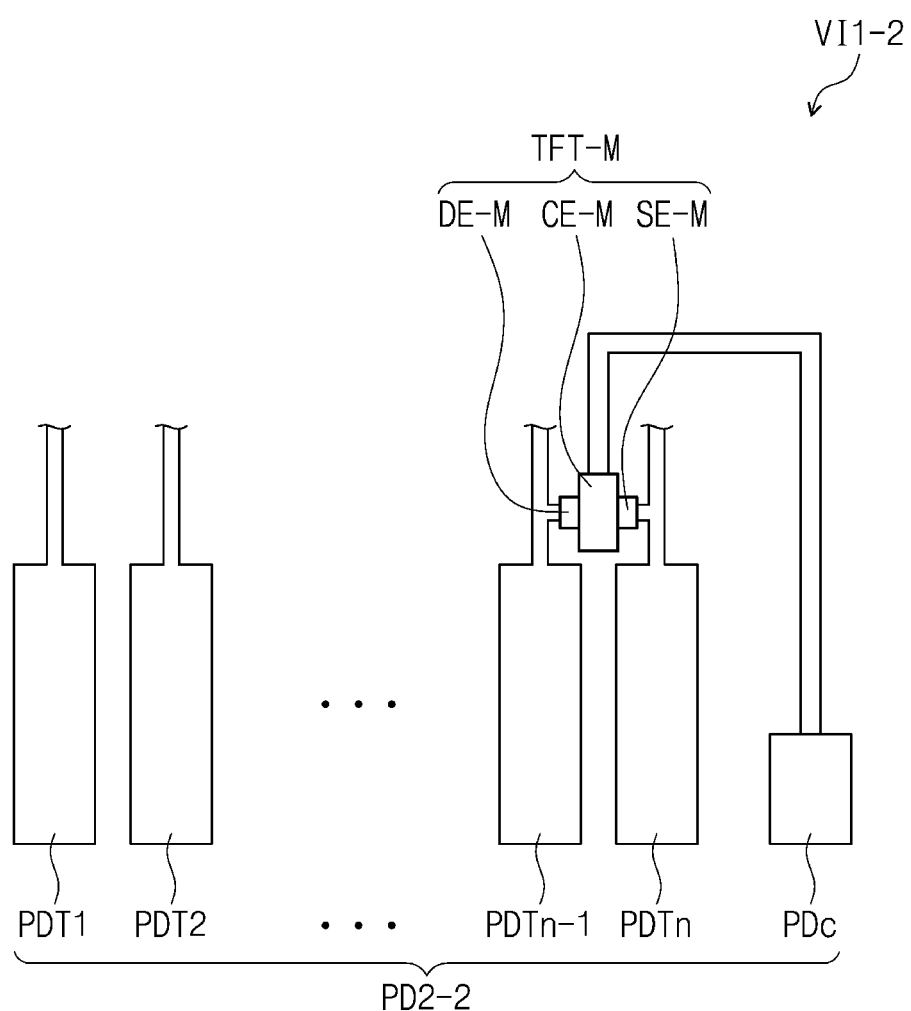
FIG. 11A is a view showing an exemplary embodiment of a first test pad area according to the invention.
Figure 11B:
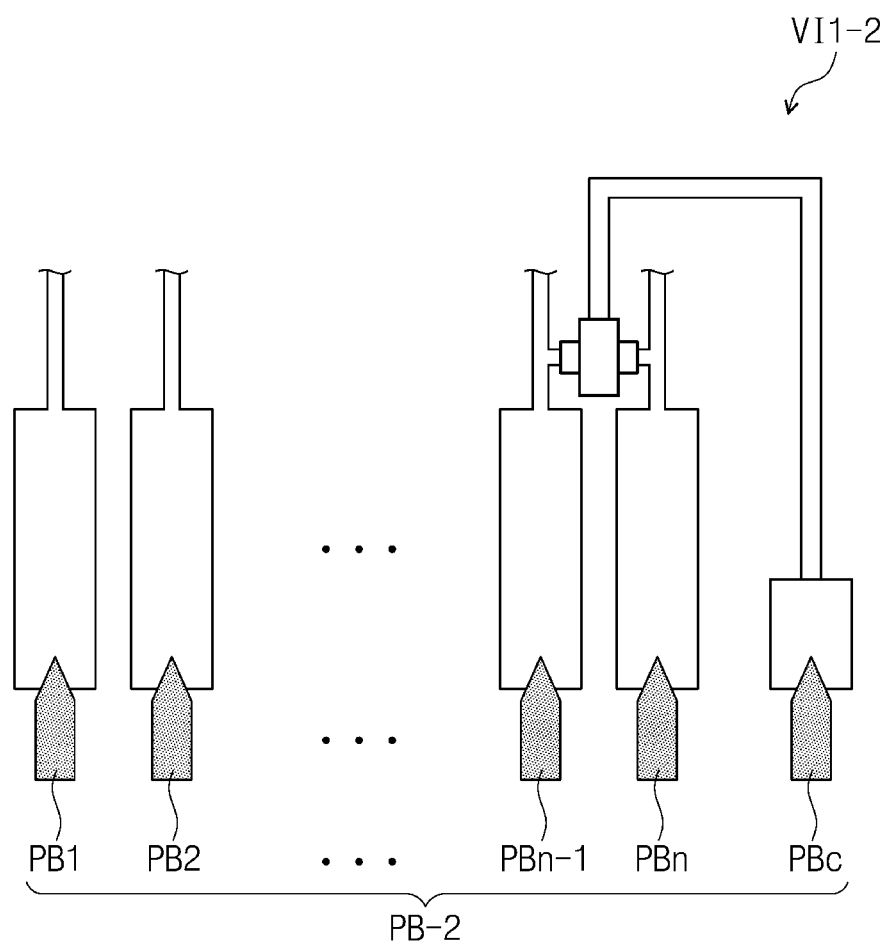
FIG. 11B is a view showing probe pins of the test equipment, which contact the first test pad area shown in FIG. 11A.

FIG. 11A is a view showing a first test pad area VI1-2 according to an exemplary embodiment of the invention. FIG. 11B is a view showing probe pins PB-2 of the test equipment, which contact the first test pad area VI1-2 shown in FIG. 11A.

The first test pad area VI1-2 may include a plurality of second pads PD2-2 and a switching device TFT-M (hereinafter, referred to as a "test transistor"). The second pads PD2-2 may include a plurality of test pads PDT1 to PDTn and a control pad PDc.

An (n−1)th test pad PDTn−1 and an n-th test pad PDTn may be connected to each other by the test transistor TFT-M.

The test transistor TFT-M may include an input electrode SE-M, an output electrode DE-M, and a control electrode CE-M. The input electrode SE-M may be connected to the n-th test pad PDTn. The output electrode DE-M may be connected to the (n−1)th test pad PDTn−1. The control electrode CE-M may be connected to the control pad PDc.

The probe pins PB-2 of the test equipment may include test pins PB1 to PBn and a control pin PBc. The test pins PB1 to PBn correspond to the test pads PDT1 to PDTn, and the control pin PBc corresponds to the control pad PDc.

The control pin PBc may apply a turn-on signal (or a turn-on voltage) to the control pad PDc. An n-th probe pin PBn may apply the test signal SGT (refer to FIG. 6) to the n-th test pad PDTn while the turn-on signal is applied to the control pad PDc. An (n−1)th probe pin PBn−1 may measure the test signal SGT (refer to FIG. 6). According to another exemplary embodiment of the invention, the (n−1)th probe pin PBn−1 and the n-th probe pin PBn may perform each other's function.

Figure 12A:
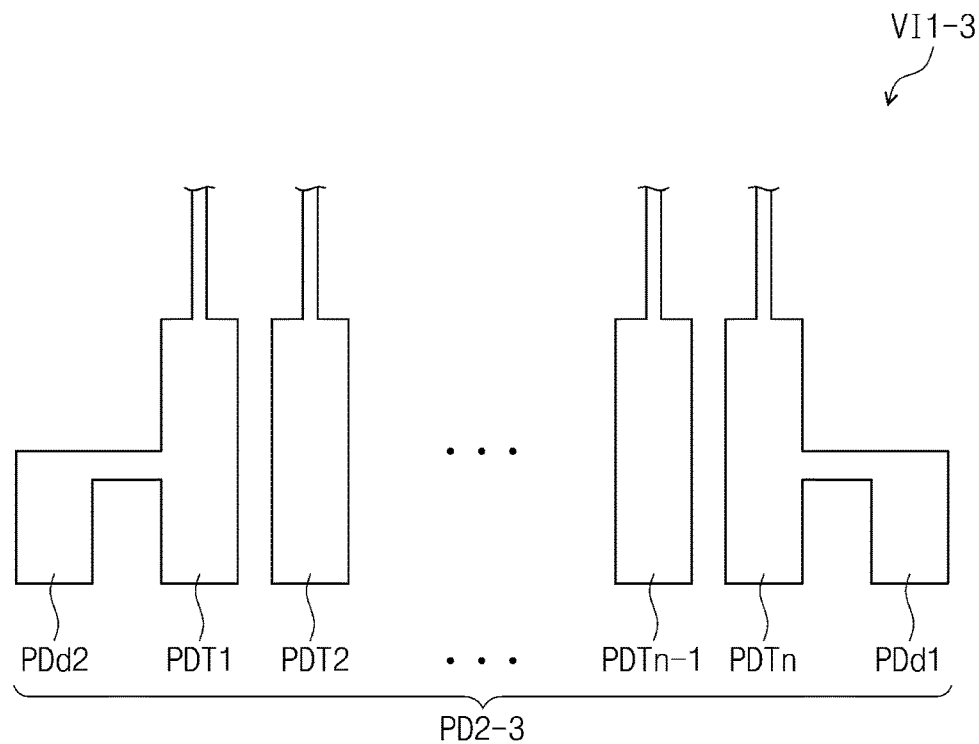
FIG. 12A is a view showing an exemplary embodiment of a first test pad area according to the invention.
Figure 12B:
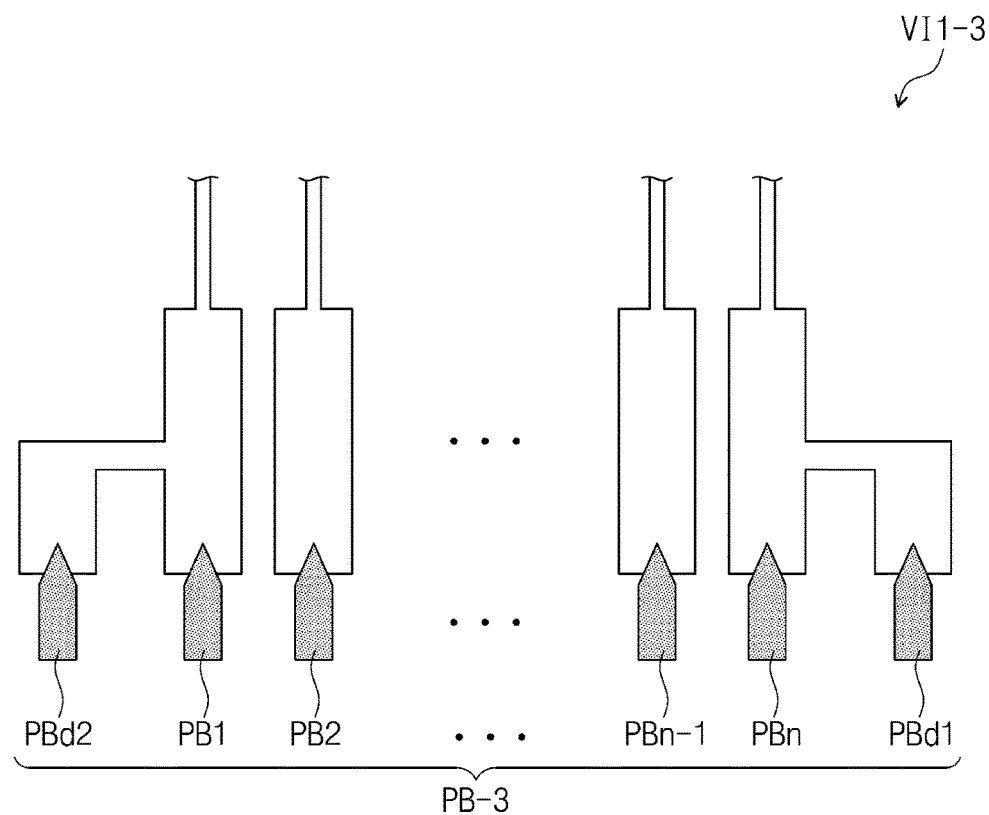
FIG. 12B is a view showing probe pins of the test equipment, which contact the first test pad area shown in FIG. 12A.

FIG. 12A is a view showing a first test pad area VI1-3 according to an exemplary embodiment of the invention. FIG. 12B is a view showing probe pins PB-3 of the test equipment, which contact the first test pad area VI1-3 shown in FIG. 12A.

The first test pad area VI1-3 may include a plurality of second pads PD2-3. The second pads PD2-3 may include a plurality of test pads PDT1 to PDTn, a first dummy pad PDd1, and a second dummy pad PDd2.

The first dummy pad PDd1 may be connected to an n-th test pad PDTn, and the second dummy pad PDd2 may be connected to a first test pad PDT1. However, the invention is not limited thereto, and the connection relation between the dummy pads PDd1 and PDd2 and the test pads PDT1 to PDTn may be changed.

The probe pins PB-3 may include test pins PB1 to PBn, a first dummy pin PBd1, and a second dummy pin PBd2. The test pins PB1 to PBn may respectively correspond to the test pads PDT1 to PDTn. The first dummy pin PBd1 may correspond to the first dummy pad PDd1, and the second dummy pin PBd2 may correspond to the second dummy pad PDd2.

In the exemplary embodiment of the invention, it may be checked whether the second pads PD2-3 are accurately aligned with the test equipment using the dummy pads PDd1 and PDd2, the first test pad PDT1, and the n-th test pad PDTn.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A display module comprising:
a plurality of pixels;
a plurality of data lines connected to the plurality of pixels;
a demultiplexer connected to the plurality of data lines;
a plurality of first pads connected to the demultiplexer; and
a plurality of second pads comprising:
a plurality of first test pads connected to corresponding data lines of the plurality of data lines;
a first dummy pad connected to one first test pad of the plurality of first test pads, and
a sub-pad insulated from the plurality of first test pads and the first dummy pad.
2. The display module of claim 1, further comprising a printed circuit board connected to the plurality of first pads.

3. The display module of claim 2, further comprising a plurality of third pads comprising a plurality of second test pads connected to corresponding data lines of the plurality of data lines and a second dummy pad connected to one second test pad of the plurality of second test pads.

4. The display module of claim 3, wherein the plurality of first pads are disposed between the plurality of second pads and the plurality of third pads.

5. The display module of claim 4, wherein the one first test pad among the plurality of first test pads is disposed at an outermost position among the plurality of first test pads, and the one second test pad among the plurality of second test pads is disposed at an outermost position among the plurality of second test pads.

6. The display module of claim 2, further comprising a driving circuit disposed on the printed circuit board.

7. The display module of claim 6, wherein the demultiplexer receives a data signal from the driving circuit and applies the data signal to at least one of the plurality of data lines.

8. The display module of claim 1, wherein the sub-pad is disposed between the one first test pad among the plurality of first test pads and the first dummy pad.

9. The display module of claim 1, further comprising a switching device which comprises:
    an input electrode connected to the first dummy pad;
    an output electrode connected to one of the plurality of first test pads; and
    a control electrode.

10. The display module of claim 9, wherein the plurality of second pads further comprises a control pad connected to the control electrode of the switching device.

11. The display module of claim 1, wherein the plurality of second pads further comprises a second dummy pad connected to one of the plurality of first test pads.

12. The display module of claim 1, wherein the plurality of first test pads is spaced apart from each other at a first distance, and the one first test pad of the plurality of first test pads and the first dummy pad are spaced apart from each other at a second distance different from the first distance.

13. The display module of claim 12, wherein the second distance is greater than the first distance.

14. A method of testing a display module, the method comprising:
    aligning a display module comprising a plurality of test pads and a dummy pad connected to one test pad among the plurality of test pads with a test equipment comprising a plurality of probe pins corresponding to the plurality of test pads and the dummy pad;
    performing a first testing operation which applies a first electrical signal to the one test pad among the plurality of test pads and measures the applied first electrical signal through the dummy pad; and
    performing a second testing operation which applies a second electrical signal to each of the plurality of test pads.

15. The method of claim 14, further comprising determining whether to proceed the second testing operation depending on a result of the first testing operation.

16. The method of claim 15, wherein the display module further comprises a plurality of pixels and a plurality of data lines connected to the plurality of pixels, and
    the plurality of test pads is connected to the plurality of data lines.

17. The method of claim 14, wherein the display module further comprises a sub-pad insulated from the plurality of test pads and the dummy pad, and
    the plurality of test pads, the dummy pad and the sub-pad are aligned in a line.

18. The method of claim 14, wherein the display module further comprises a switching device which comprises:
    an input electrode connected to the dummy pad;
    an output electrode connected to one of the plurality of test pads; and
    a control electrode to which a turn-on voltage is applied in the first testing operation.

* * * * *